(12) United States Patent
Vajravel et al.

(10) Patent No.: US 11,308,001 B1
(45) Date of Patent: Apr. 19, 2022

(54) DYNAMICALLY PROVISIONING PERIPHERALS TO CONTAINERS

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/205,343

(22) Filed: Mar. 18, 2021

(51) Int. Cl.
  *G06F 13/10* (2006.01)
  *H04W 12/60* (2021.01)
  *G06F 11/30* (2006.01)

(52) U.S. Cl.
  CPC .......... *G06F 13/10* (2013.01); *G06F 11/3051* (2013.01); *G06F 2213/2408* (2013.01); *H04W 12/66* (2021.01)

(58) Field of Classification Search
  CPC ..... G06F 11/3051; G06F 13/10; H04W 12/66
  See application file for complete search history.

(56) References Cited

U.S. PATENT DOCUMENTS

| | | | | |
|---|---|---|---|---|
| 2005/0108562 | A1* | 5/2005 | Khazan | G06F 21/566 726/23 |
| 2020/0174813 | A1* | 6/2020 | Jain | G06F 9/4856 |
| 2021/0266743 | A1* | 8/2021 | Kvochko | G06N 20/00 |

* cited by examiner

*Primary Examiner* — Zachary K Huson
(74) *Attorney, Agent, or Firm* — Kirton McConkie; Brian Tucker

(57) ABSTRACT

Peripherals may be dynamically provisioned to containers. A peripheral arbitrator may be run in the host operating system environment to detect when containers are started. When a container is started, the peripheral arbitrator may determine which peripherals an application running in the container may use or require. The peripheral arbitrator may then identify any available peripherals matching the application's peripheral requirements and provision the peripherals to the container to thereby make the peripherals accessible to the application. In some instances, the peripheral arbitrator may use a trust score to determine whether to provision available peripherals to a container.

16 Claims, 15 Drawing Sheets

DYNAMICALLY PROVISIONING PERIPHERALS TO CONTAINERS

CROSS-REFERENCE TO RELATED APPLICATIONS

N/A

BACKGROUND

Containerization in the software context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 120. Application 121 is an example of an application that is not containerized in that it relies on binaries/libraries 120 to interface directly with host operating system 110. In contrast, application 122 represents an application that is executed in a first type of container in which containerization is implemented using access control mechanisms 123. Examples of solutions that implement containerization through access control mechanisms 123 include Security-Enhanced Linux (SELinux) and AppArmor.

Applications 123 and 124 represent examples of applications that are executed in a second type of container in which containerization is implemented using software virtualization. Examples of solutions that implement containerization through software virtualization include Docker and FreeBSD Jails. As represented in FIG. 1, each application 123 and 124 and its binaries/libraries 131$a$ and 131$b$ may be isolated within its own container 132 that is executed via a docker engine 130 that runs on host operating system 110. Variations of this second type of container include Intel Software Guard Extensions (SGX) and Arm TrustZone which containerize an application within a secure region of memory.

Applications 125 and 126 represent examples of applications that are executed in a third type of container in which containerization is implemented using hardware virtualization. Examples of solutions that implement containerization through hardware virtualization include Intel Clear Containers, Hyper-V Docker and Qubes OS. As represented in FIG. 1, with this third type of container, a uni/mini kernel 140 is executed on hypervisor 102. A docker engine 141 can then be run on uni/mini kernel 140 to containerize applications 125 and 126 and their respective binaries/libraries 142$a$ and 142$b$.

Although not represented in FIG. 1, it is even possible to combine multiple types of containerization solutions. For example, Docker may be used with SELinux to execute an application. As another example, Graphene combines software enclaves (e.g., Intel SGX) with hardware virtualization (e.g., via a unikernel). Accordingly, there is a wide variety of container modes for executing an application.

It is becoming more common for an enterprise to use containerization solutions to run applications on computing devices that its employees may use. A primary benefit of employing containerization solutions is that it enables the applications to be deployed and launched from a cloud-based management server or other centralized repository as opposed to being installed on the computing devices in a traditional manner. As a result, the employees can launch the applications on a variety of computing devices.

Although employing a containerized environment to run applications on a computing device provides various benefits, it also introduces a number of limitations. For example, containers have traditionally been used to run background services or applications that do not interface with the user. More recently, however, it is becoming common to run user interactive applications in containers. In such cases, it may be necessary to allow the containers to access peripherals.

To allow a peripheral to be accessed from within a container, containerization solutions may provide functionality by which the peripheral may be mapped to the container. However, this mapping functionality is highly technical and oftentimes beyond the capabilities of end users and even administrators. Additionally, mapping peripherals to containers can be a tedious and overwhelming task, particularly when many containerized applications may be deployed on a large number of computing devices.

The mapping of a peripheral to a container may also isolate the peripheral to a single containerized application as opposed to having the peripheral remain accessible to any application running on the computing device. For example, if multiple containers are deployed on a computing device and a peripheral is mapped to one of the containers, any application running in the other containers will be unable to access the peripheral. This creates difficulties when such applications must remain connected to the peripheral at all times. For example, if multiple applications must remain connected to a single smart card reader, it may not be possible to deploy the applications in separate containers on the same computing device because only one of the applications will be able to connect to the smart card reader at any given time.

The mapping of peripherals to containers also creates security vulnerabilities. For example, if a printer is mapped to a particular container, the printer will remain accessible to any application running in the container regardless of the environment of the computing device. In other words, providing a container with access to a peripheral is an all-of-nothing approach. There is no mechanism for selectively mapping a peripheral to a container.

BRIEF SUMMARY

The present invention extends to systems, methods and computer program products for dynamically provisioning peripherals to containers. A peripheral arbitrator may be run in the host operating system environment to detect when containers are started. When a container is started, the peripheral arbitrator may determine which peripherals an application running in the container may use or require. The peripheral arbitrator may then identify any available peripherals matching the application's peripheral requirements and provision the peripherals to the container to thereby make the peripherals accessible to the application. In some instances, the peripheral arbitrator may use a trust score to determine whether to provision available peripherals to a container.

In some embodiments, the present invention may be implemented as a method for dynamically provisioning a peripheral to a container. A first container may be identified on a computing device. Peripheral requirements of an application running in the first container may be determined. It may also be determined that a first peripheral available on the computing device matches the peripheral requirements. The first peripheral may then be provisioned to the first container.

In some embodiments, the present invention may be implemented as computer storage media storing computer executable instructions which when executed on a computing device implement a method for dynamically provisioning peripherals to containers on the computing device. It can be detected when an application has been launched in a container. Peripheral requirements for the application can then be determined. One or more peripherals may then be provisioned to the container based on the peripheral requirements.

In some embodiments, the present invention may be implemented as a computing device that includes one or more processors and one or more computer storage media which store a peripheral arbitrator that executes in a host operating system environment and a container agent that executes within a container. The peripheral arbitrator and the container agent may be configured to identify peripheral requirements for an application executing in the container and to provision one or more peripherals to the container based on the peripheral requirements.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "containerized environment" will be used to reference a computing device on which applications may be run in containers, including hardware containers and software containers. A containerized environment may include a single type of container or multiple types of containers. The containerized environment could exist on an end user computing device or on a server computing device (e.g., when the containerized applications are accessed by the end user via a virtual desktop infrastructure).

Figure 1:
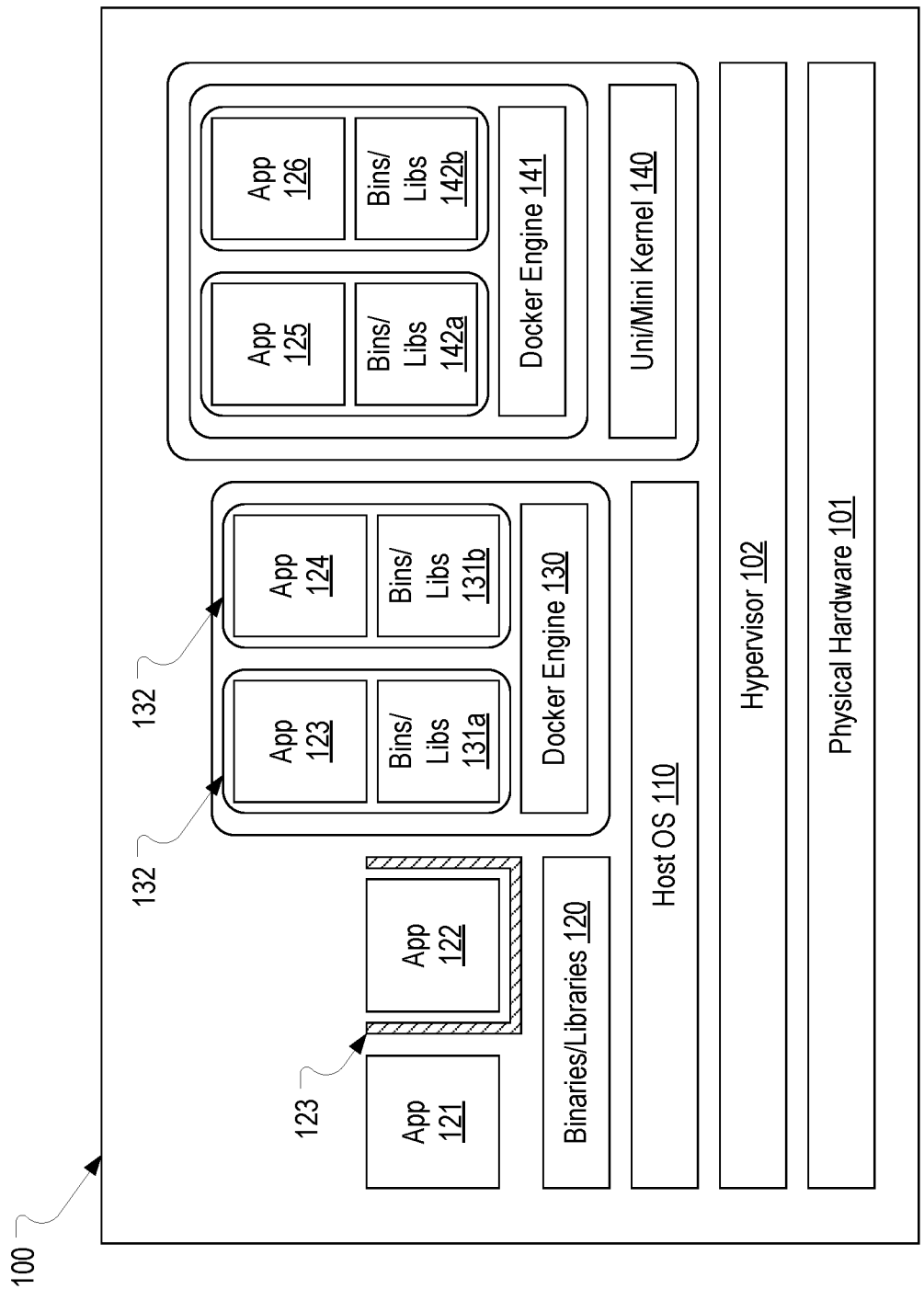
FIG. 1 provides examples of various types of containers that can be used to execute an application on a computing device.
Figure 2:
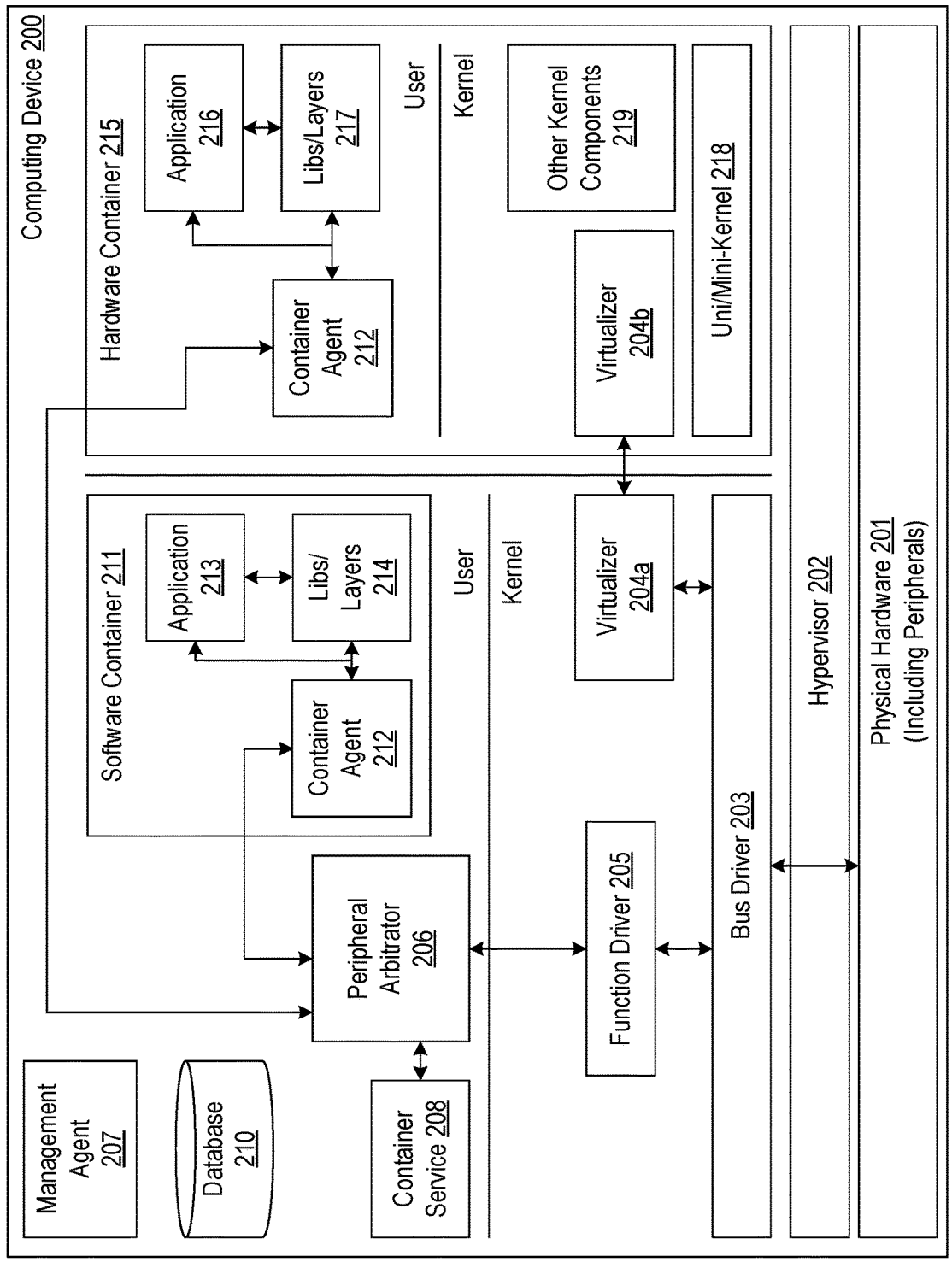
FIG. 2 provides an example of various components that may be employed on a computing device to dynamically provision peripherals to containers in accordance with one or more embodiments of the present invention.

FIG. 2 provides an example of various components that may be employed on a computing device 200 to provision peripherals to containers in a containerized environment that exists on computing device 200. FIG. 2 is generally similar to FIG. 1 but includes a number of additional components for implementing embodiments of the present invention. As shown, computing device 200 can include physical hardware 201 that may include peripherals. These peripherals could be integrated into computing device 200 or connected to computing device 200 at any time. For example, the peripherals could include a webcam, a microphone, a USB storage drive, a printer, etc. In some embodiments, a hypervisor 202 may also exist on computing device 200 such as when hardware containers may be employed.

Various drivers may be loaded on computing device 200 to provide access to a peripheral. For example, a bus driver 203 may support access to peripherals connected to a common bus. Additionally, a peripheral-specific function driver 205 may be loaded above bus driver 203 thereby creating a device stack for the peripheral. Although a single function driver 205 is shown, there may be multiple function drivers 205 loaded on computing device 200 corresponding to the peripherals that are connected to computing device 200. As is known, user mode components can interface with function driver 205 to access the corresponding peripheral.

In scenarios where one or more hardware containers 215 may be created on computing device 200, a virtualizer 204a can be employed on the host operating system in conjunction with a virtualizer 204b in the hardware container 215 to virtualize a peripheral within hardware container 215. More particularly, virtualizers 204a and 204b can cause a virtual peripheral to be accessible within hardware container 215 and can route communications targeting the virtual peripheral to the actual peripheral. Virtualizers 204a and 204b can employ any suitable virtualization technique to accomplish this (e.g., USB redirection, driver mapping, etc.). Similar to what is shown in FIG. 1, hardware container 215 may include a uni/mini-kernel 218 and other kernel components 219.

In accordance with embodiments of the present invention, a peripheral arbitrator 206 can be run in the host operating system environment. In the depicted embodiment, peripheral arbitrator 206 is implemented as a user mode service. However, peripheral arbitrator 206 could be implemented in any other suitable manner. A container service 208 may also be loaded on computing device 200 and may represent any components that manage containers on computing device 200. As one example only, container service 208 could represent the Docker daemon and its corresponding CLI and API. Peripheral arbitrator 206 may interface with container service 208 such as to detect when a container is deployed.

A database 210 may be maintained on computing device 200 for storing various types of information that peripheral arbitrator 206 may employ. Database 210 can represent any type of storage mechanism for maintain or providing access to such information. In some embodiments, database 210 may exist on a server rather than on computing device 200. In any case, database 210 may preferably be managed centrally (e.g., via a management server that interfaces with management agent 207) to thereby allow an administrator to define and distribute information to many computing devices that include peripheral arbitrator 206. Such information (e.g., policies, rules, instructions, etc.) may be specific to computing device 200 or specific to a particular user or may be applicable to some other category or grouping of computing devices and/or users. Management agent 207 may be run in the host operating system environment to enable remote management of database 210. Management agent 207 is depicted as separate from peripheral arbitrator 206 based on the functionality they perform, however, the functionality performed by management agent 207 and peripheral arbitrator 206 could be integrated into a single component.

When a software container 211 is created to host an application 213 that relies on libraries/layers 214, an instance of container agent 212 can be included within software container 211. Similarly, when a hardware container 215 is created to host an application 216 that relies on libraries/layers 217, an instance of container agent 212 can be included within hardware container 215. As an overview, peripheral arbitrator 206 can interface with container agent 212, whether running in a software container 211 or a hardware container 215, to determine if and how peripherals are to be provisioned to the container and to accomplish the provisioning.

Figure 3A:
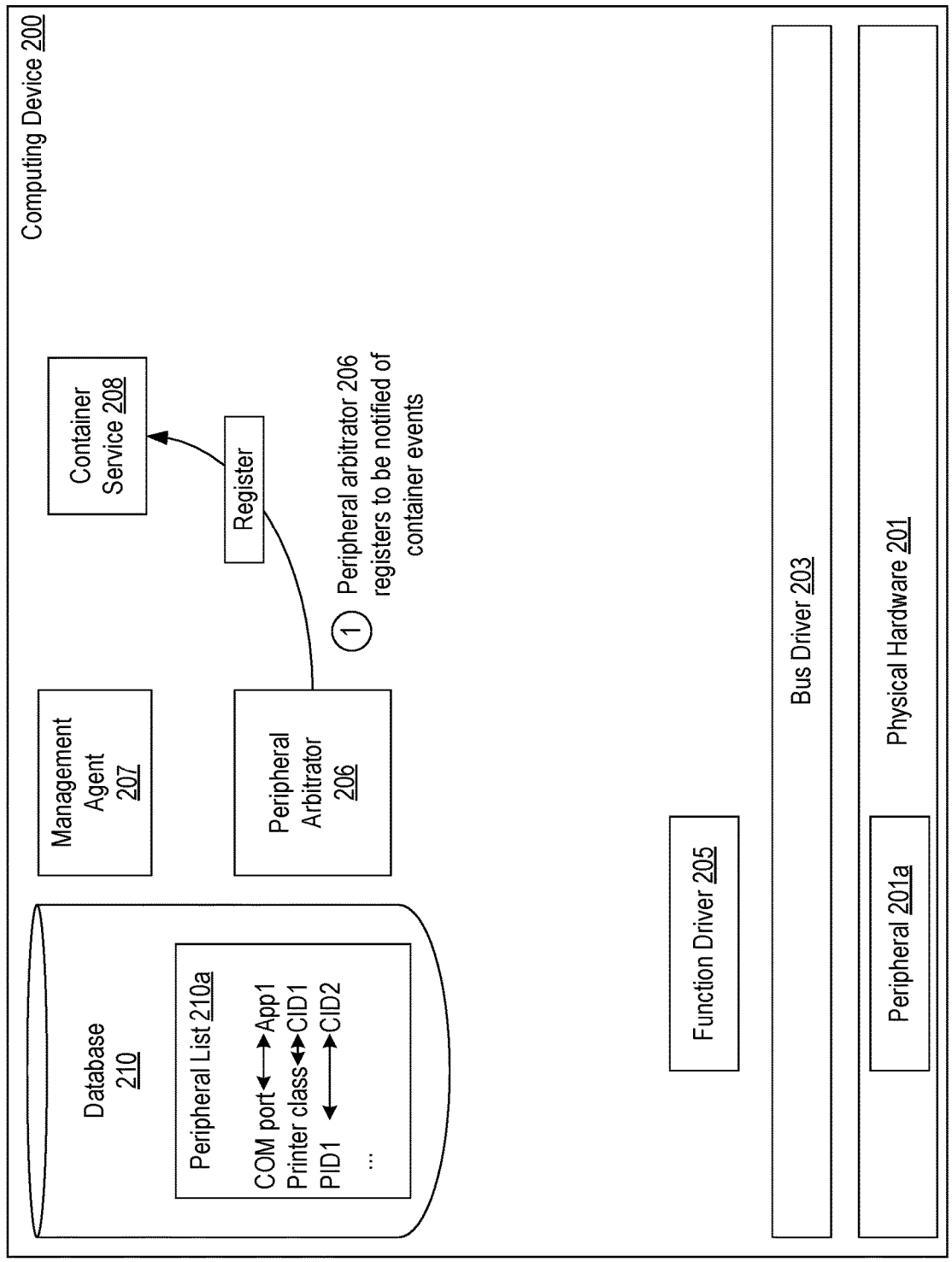
FIGS. 3A-3F provide an example of how it can be dynamically determined which, if any, peripherals should be provisioned to a container in response to the container being created/started on a computing device.

FIGS. 3A-3F provide an example of how peripheral arbitrator 206 may dynamically provision a peripheral to a container on computing device 200. Although this example is based on software container 211, the same process can be followed when a hardware container is created on computing device 200. In FIG. 3A, it is assumed that a peripheral 201a is connected to (or integrated into) computing device 200 and that function driver 205 has been loaded to make peripheral 201a accessible on computing device 200. It will also be assumed that, at this point, no containers have been loaded (e.g., the user has not launched any containerized applications), but container service 208 is running and ready to create such containers. In step 1, peripheral arbitrator 206 can register to be notified of container events on computing device 200. For example, peripheral arbitrator 206 could submit a request to container service 208 to cause container service 208 to notify peripheral arbitrator 206 whenever a container is started or stopped on computing device 200. Notably, if multiple types of containers are used on computing device 200, step 1 could encompass registering with multiple different container services 208.

FIG. 3A also shows that database 210 may include a peripheral list 210a which associates peripherals with containers. For example, peripheral list 210a may associate a particular type or class of peripheral (e.g., COM port peripherals, USB printer class peripherals, etc.) or a particular peripheral (e.g., a peripheral with a unique identifier of PID1) with a unique identifier of a container (e.g., CID1 or CID2) or some other information about a container (e.g., a name of an application, such as App1, hosted in the container, an IP address of the container, etc.). Peripheral list 210a is intended to be a generalized example and any association between a peripheral and a container could be maintained in embodiments of the present invention to enable peripheral arbitrator 206 to determine that a peripheral should be provisioned to a container without inspecting the container.

In some embodiments, at least some of the content of peripheral list 210a could have been populated by peripheral arbitrator 206 as part of previous provisions of peripherals to containers on computing device 200. In some embodiments, at least some of the content of peripheral list 210a could have been populated by an administrator via management server that interfaces with management agent 207.

Figure 3B:
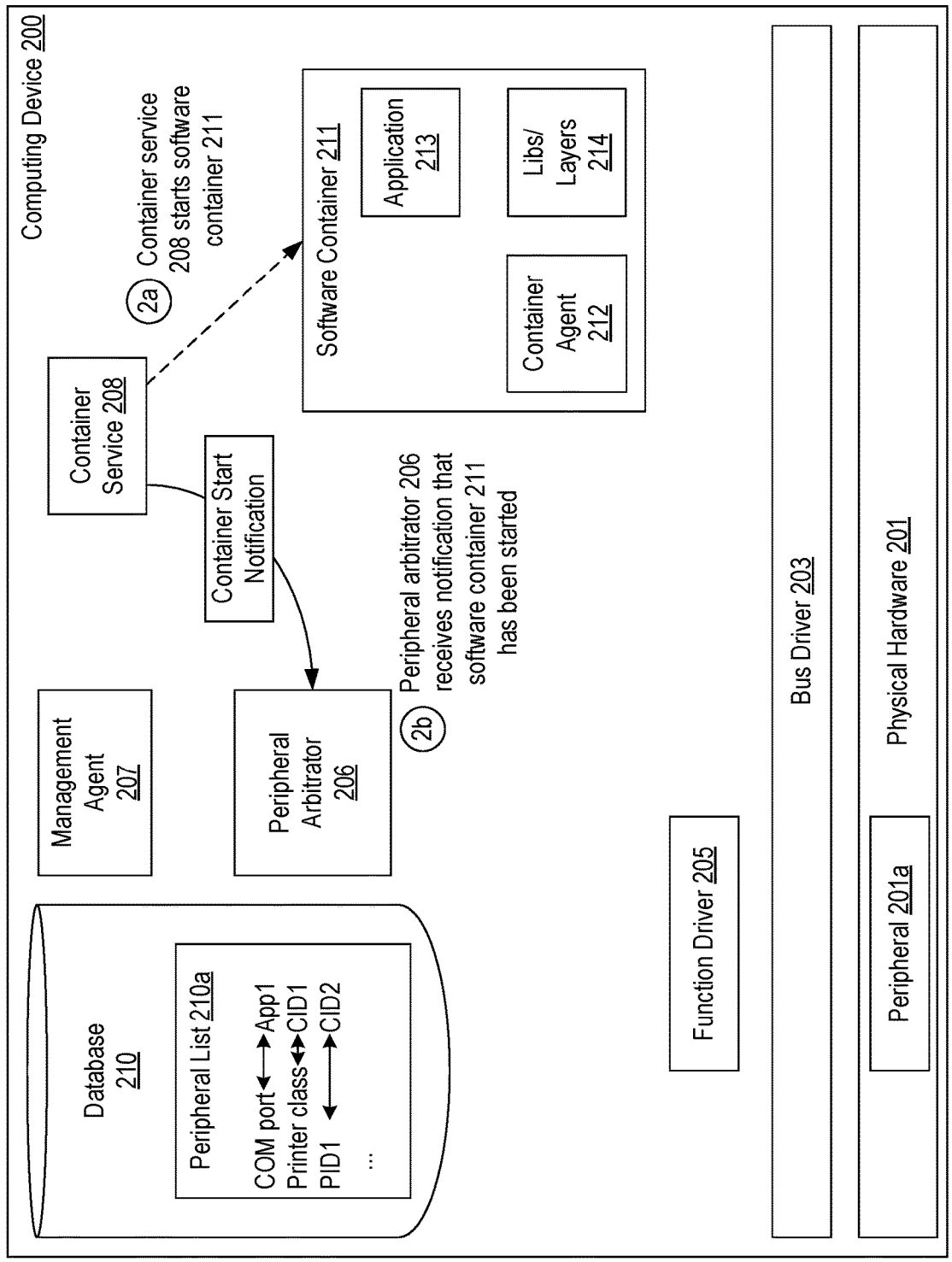

Turning to FIG. 3B, it is assumed that, in step 2a, container service 208 starts software container 211. When a container is started, it is typically created from an image that includes the application to be run within the container. In accordance with embodiments of the present invention, the image from which software container 211 is created and run can also include container agent 212 such that container agent 212 will run within software container 211 alongside application 213 and libraries/layers 214. In step 2b, in conjunction with software container 211 being started, peripheral arbitrator 206 can receive a corresponding notification.

Figure 3C:
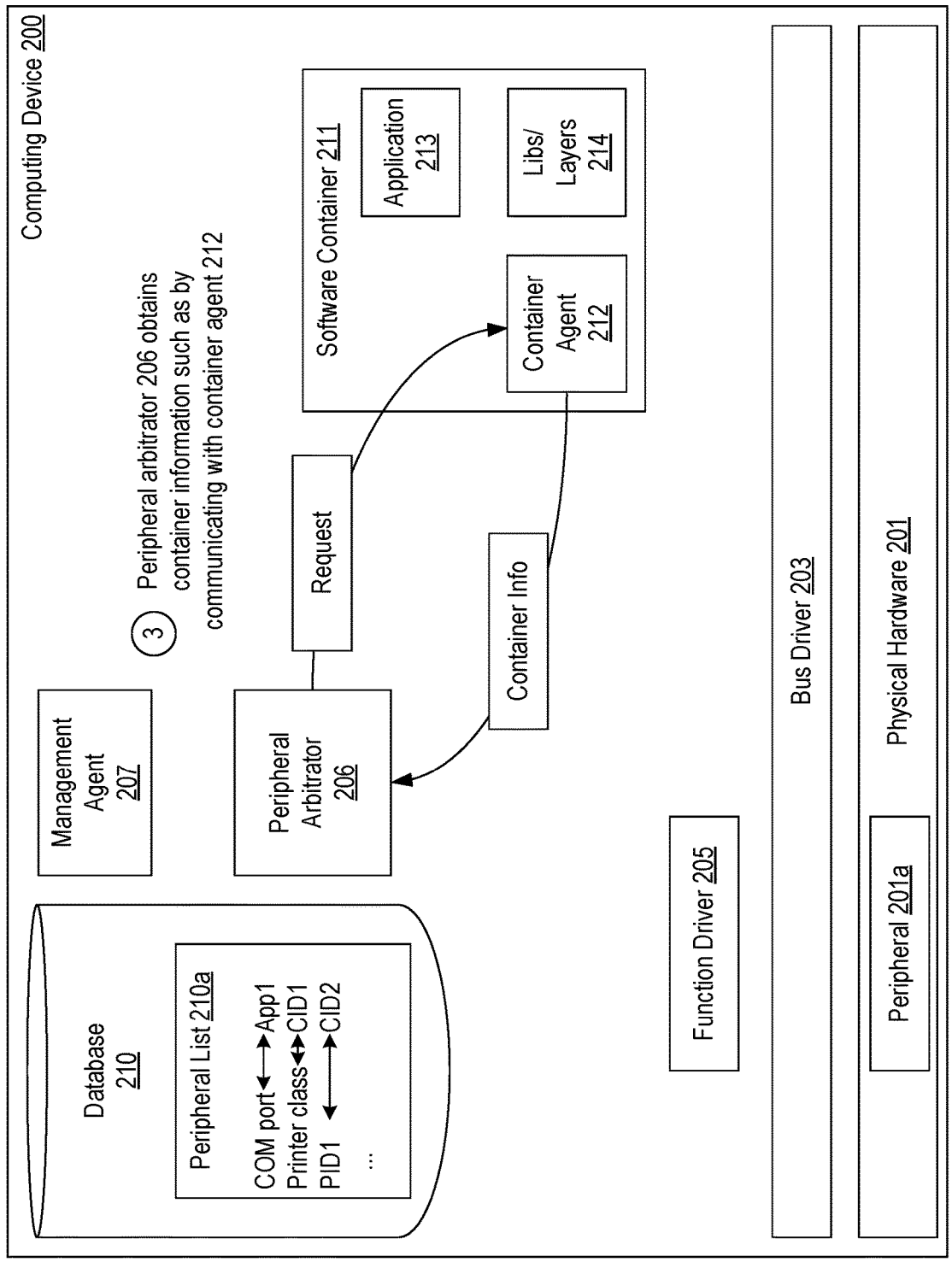

Turning to FIG. 3C, in step 3 and in response to receiving the notification that software container 211 has been started, peripheral arbitrator 206 can obtain "container information." For example, peripheral arbitrator 206 may obtain a unique identifier of software container 211, an IP address of software container 211, a name or identifier of application 213 or any other characteristics of software container 211. As represented in FIG. 3C, peripheral arbitrator 206 may obtain at least some of the container information by sending a request to the instance of container agent 212 that is running within software container 211. As an example, peripheral arbitrator 206 could request that container agent 212 provide a name, identifier or characteristics of application 213 or other characteristics of software container 211 or components running in software container 211. In some embodiments, peripheral arbitrator 206 may obtain at least some of the container information from sources other than container agent 212 (e.g., from container service 208). Of importance is that peripheral arbitrator 206 obtains sufficient container information when a container is started to enable it to determine whether and how peripherals should be provisioned to the container.

Figure 3D:
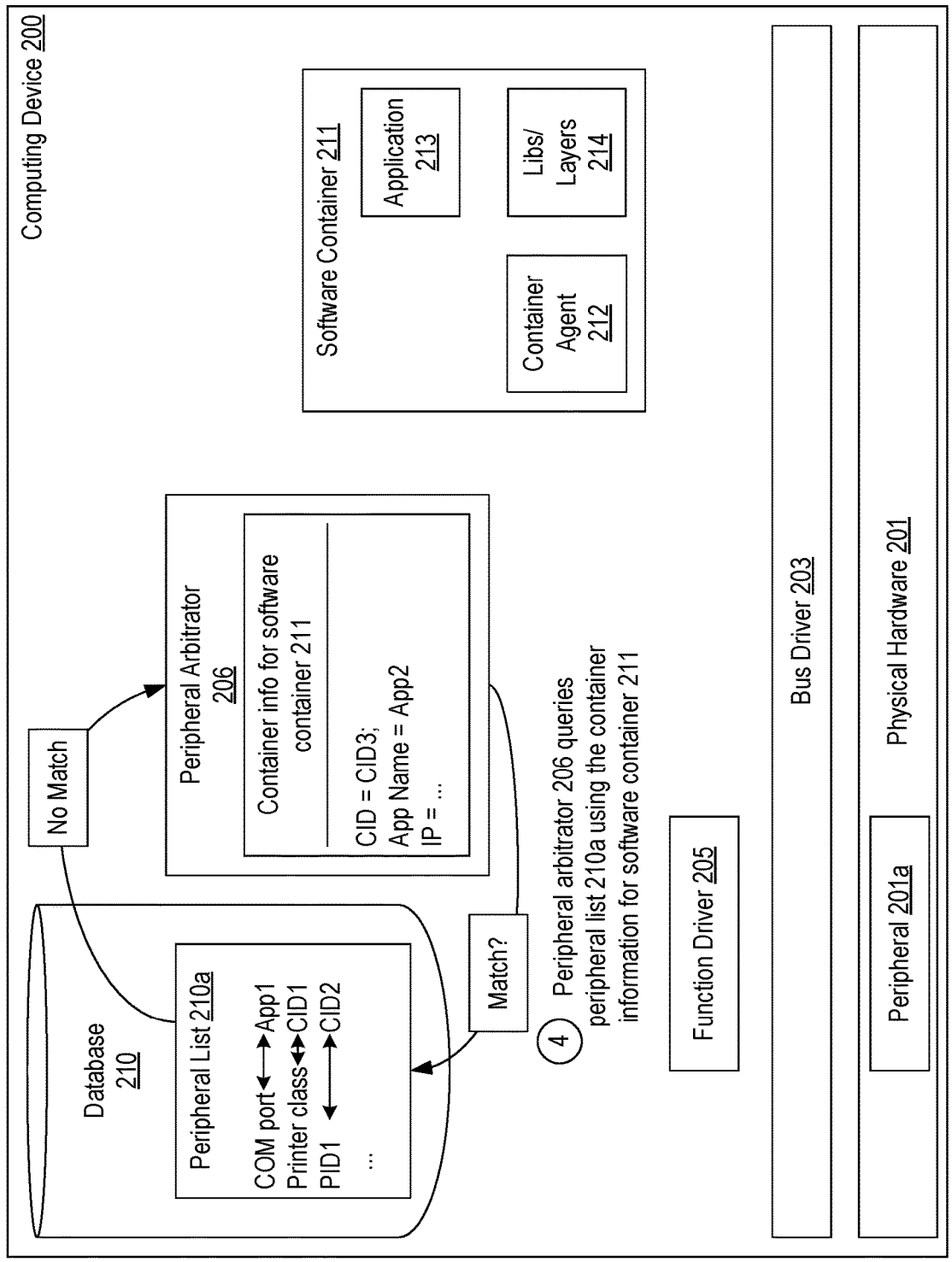

Turning to FIG. 3D, after obtaining the container information for software container 211, peripheral arbitrator 206 may query peripheral list 210a to determine if any peripherals are mapped to software container 211. In this example, it will be assumed that software container 211 has an identifier CID3 and that application 213 is named App2. Accordingly, peripheral arbitrator 206 could access peripheral list 210a to determine if any entries match this container information. In this example, it is assumed that peripheral list 210a does not map any peripheral or peripheral type to a container having an identifier of CID3, to an application having a name of App2 or to any other portion or combination of the container information for software container 211. In other words, it is assumed that peripheral list 210a does not include any entry that matches software container 211 and therefore peripheral arbitrator 206 cannot determine software container 211's peripheral requirements from peripheral list 210a.

Figure 3E:
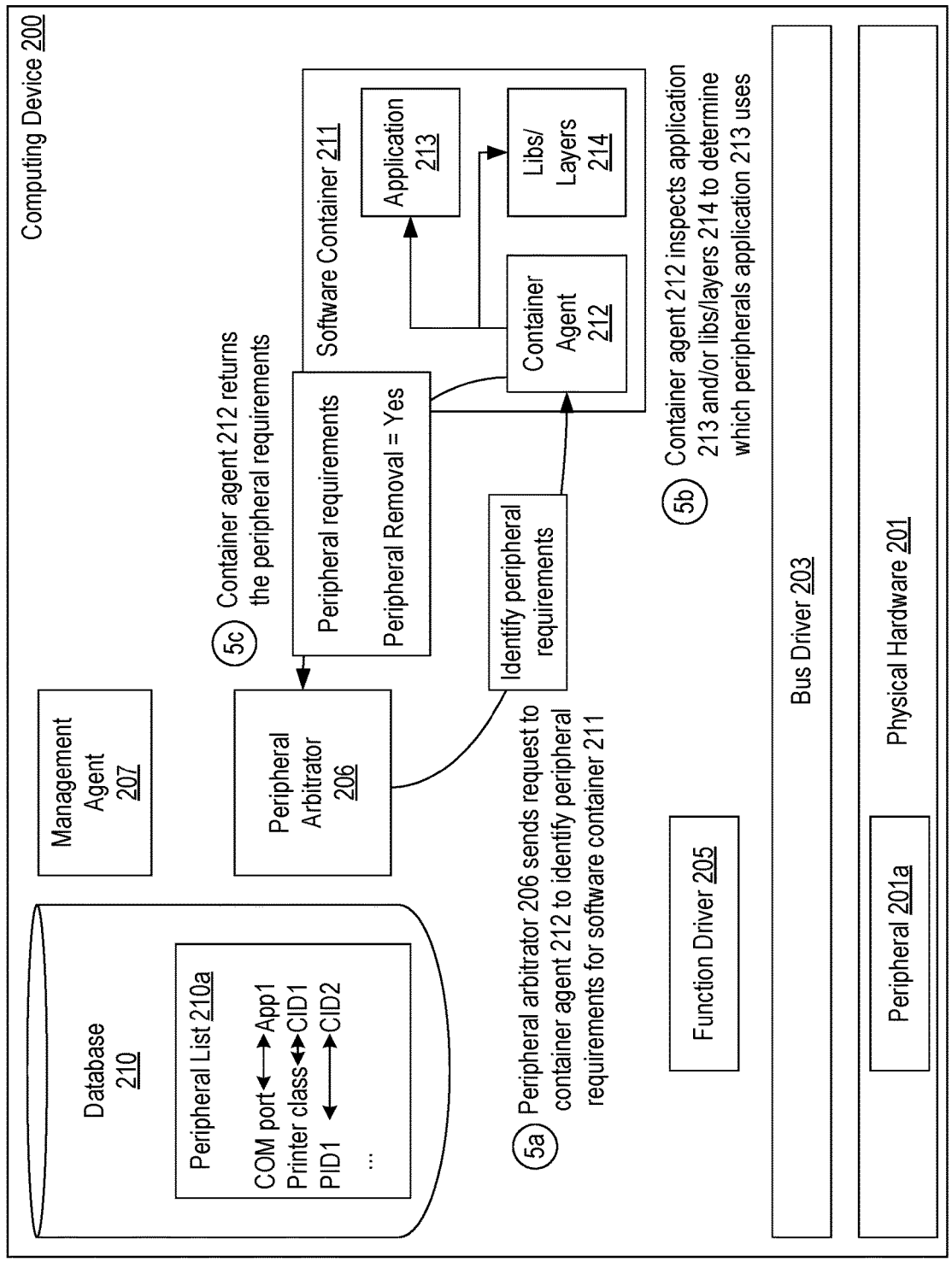

Turning to FIG. 3E, based on the assumption that peripheral arbitrator 206 could not determine software container 211's peripheral requirements by accessing peripheral list 210a, in step 5a, peripheral arbitrator 206 may send a request to container agent 212 to determine the peripheral requirements. In response, in step 5b, container agent 212 may inspect application 213 and/or libraries/layers 214 to determine which peripherals application 213 uses/requires. For example, container agent 212 may inspect application 213's import address table to determine which APIs application 213 calls. In such cases, and as an example only, if application 213 determines that application 213's import address table includes the PrintWindow API, container agent 212 can determine that application 213 requires access to printer class peripherals. Similarly, if application 213 determines that application 213's import address table includes the SCardListReaders API, container agent 212 can determine that application 213 requires access to smartcard class peripherals. As another example, if libraries/layers 214 include a DLL that is used for accessing a particular class of peripherals, container agent 212 could determine that application 213 requires access to that particular class of peripherals. Regardless of how container agent 212 may determine the peripherals that application 213 uses/requires, in step 5c, container agent 212 can return the peripheral requirements to peripheral arbitrator 206. These peripheral requirements may include a class of peripherals, a type of peripherals or possibly even a particular peripheral.

Figure 3F:
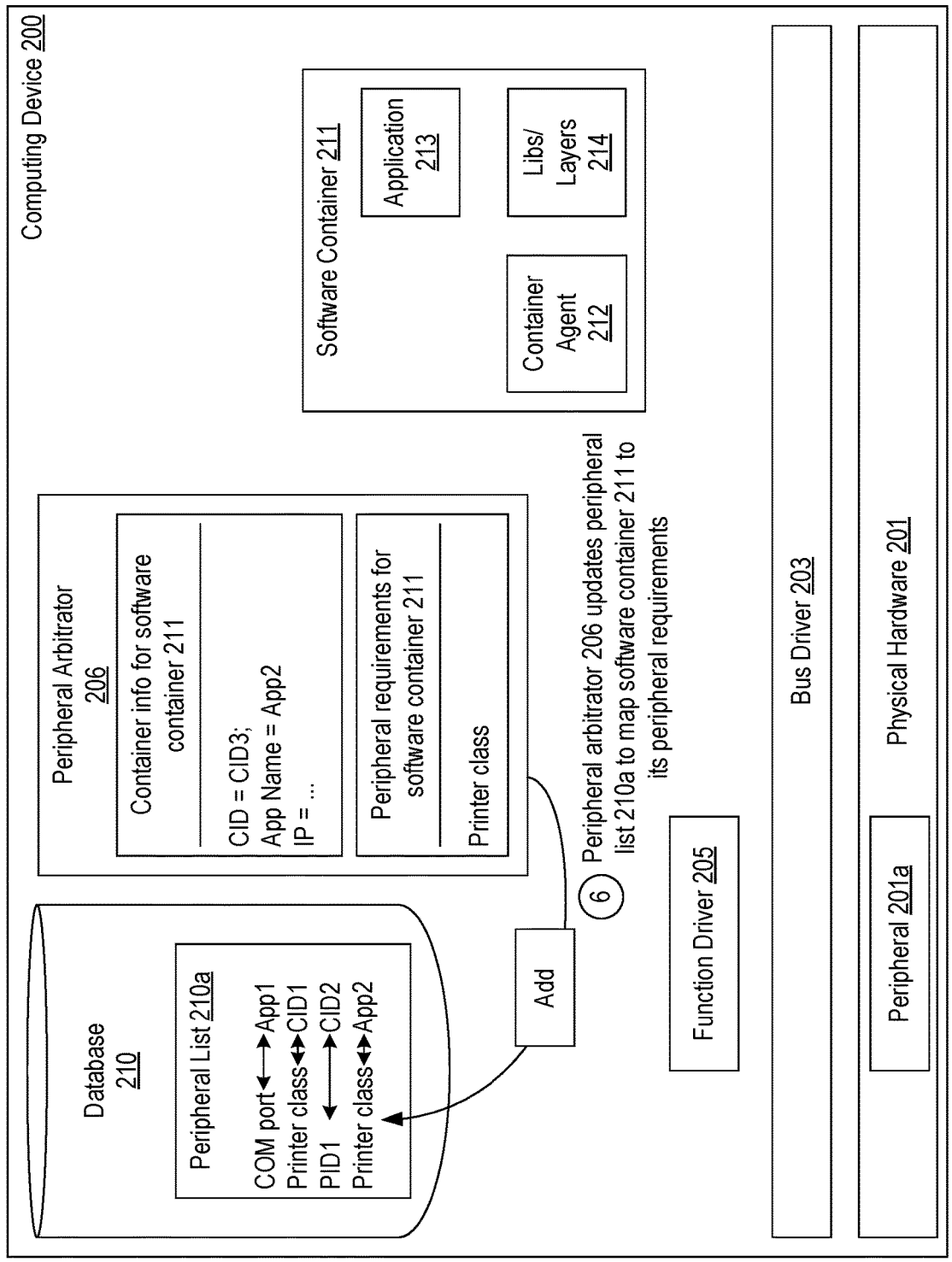

Turning to FIG. 3F, in step 6, peripheral arbitrator 206 may use the container information and the peripheral requirements for software container 211 to update peripheral list 210a. For example, peripheral arbitrator 206 may add an association between software container 211's information (e.g., the name of application 213, App2) and software container 211's peripheral requirements (e.g., printer class peripherals).

It is noted that, in some embodiments, peripheral arbitrator 206 may not leverage peripheral list 210a (or any other information in database 210) and may therefore obtain a container's peripheral requirements any time the container is created/started on computing device 200. However, by using peripheral list 210a, peripheral arbitrator 206 may avoid having to determine a container's peripheral requirements more than once. Also, in some embodiments, an administrator may populate/update peripheral list 210a so that a container's peripheral requirements may be defined/updated on computing device 200 before the container is deployed to computing device 200.

Figure 4A:
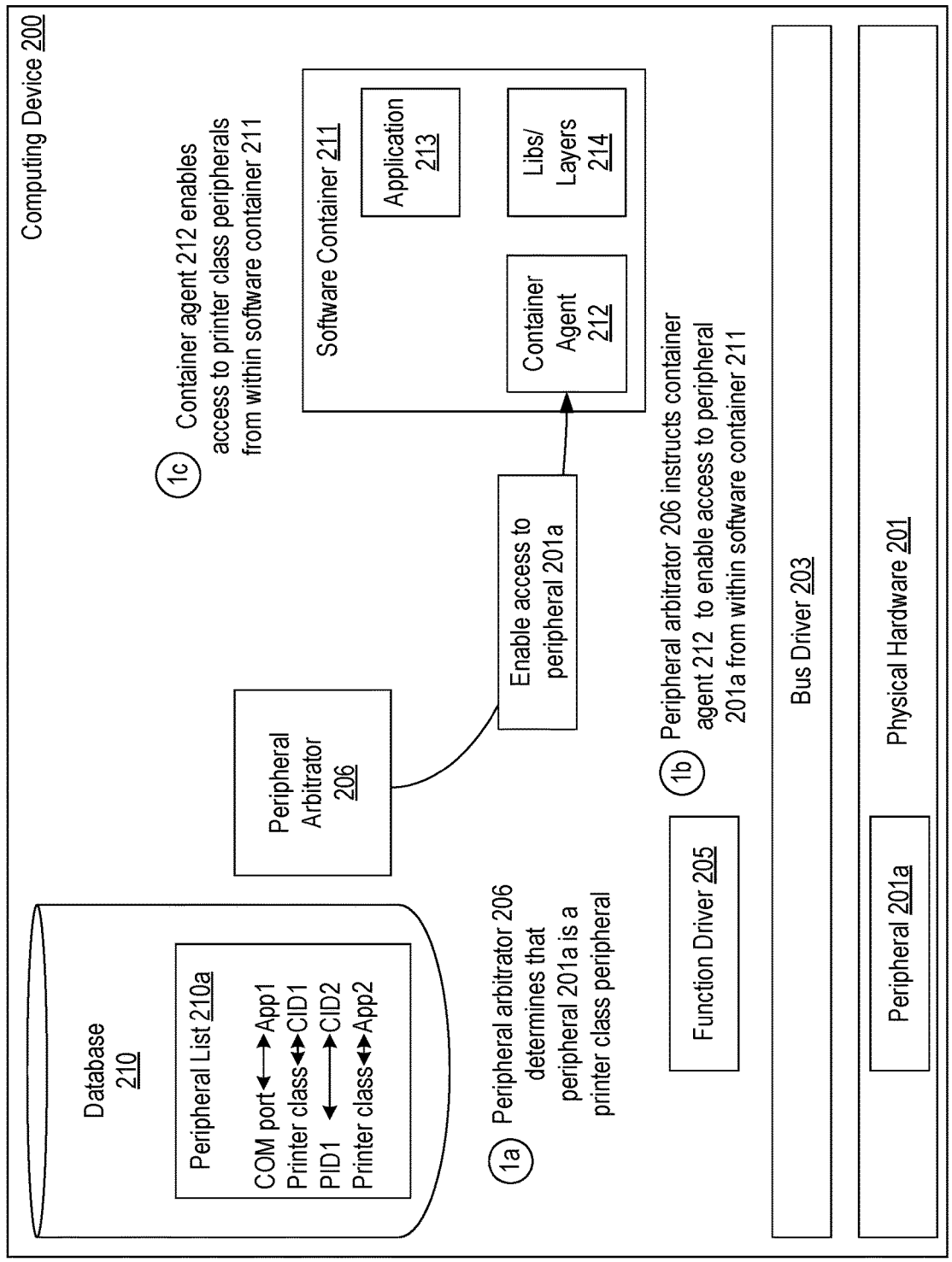
FIGS. 4A and 4B provide an example of how a peripheral may be dynamically provisioned to a container.
Figure 4B:
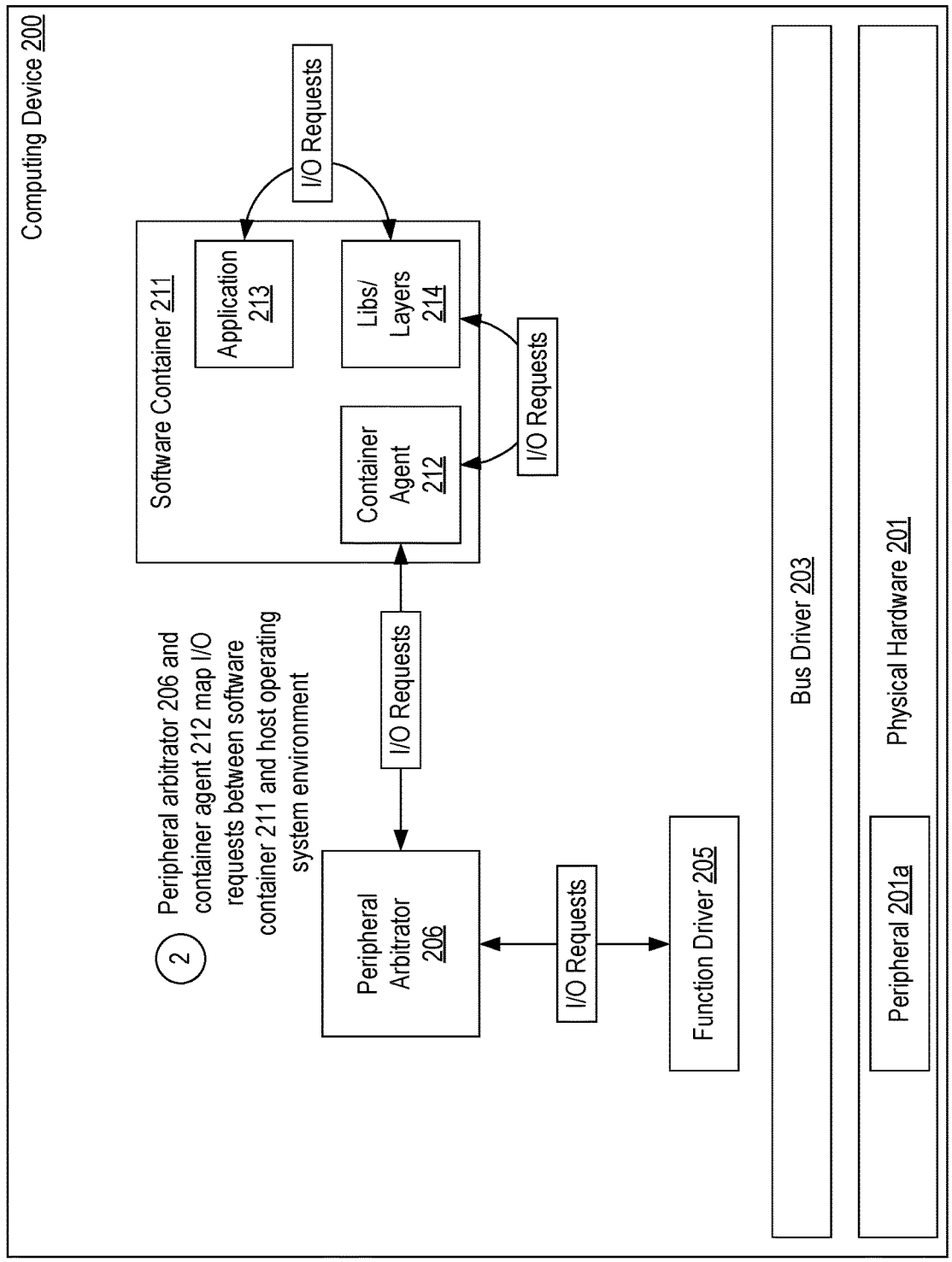

In summary, FIGS. 3A-3F represent how peripheral arbitrator 206 can dynamically determine which, if any, peripherals should be provisioned to a container in response to the container being created/started on computing device 200. Upon determining that peripherals should be provisioned to a container, peripheral arbitrator 206 may interface with container agent 212 to make any available peripherals accessible from within the container. FIGS. 4A and 4B provide an example of the process of making any available peripherals accessible within the container.

The steps represented in FIGS. 4A and 4B will be described as if they were a continuation of the steps represented in FIGS. 3A-3F. However, it is to be understood that these steps may be performed whenever software container 211 may again be started. Of importance, prior to performing the steps in FIGS. 4A and 4B, peripheral arbitrator 206 will have determined which type of peripherals should be provisioned to software container 211 if they are available (e.g., by accessing peripheral list 210a or by leveraging container agent 212 to determine the peripheral requirements). For purposes of this example, it will be assumed that peripheral 201a is a printer class peripheral.

Turning to FIG. 4A, in step 1a, peripheral arbitrator 206, which will have determined that printer class peripherals should be provisioned to software container 211, may determine that peripheral 201a is a printer class peripheral. As a result, in step 1b, peripheral arbitrator 206 may instruct container agent 212 that peripheral 201a should be accessible within software container 211. For example, peripheral arbitrator 206 could send container agent 212 an identifier of peripheral 201a and any information necessary to create a representation of peripheral 201a (e.g. a symbolic link) within software container 211. In step 1c, container agent 212 can then enable access to peripheral 201a such as by creating a symbolic link for peripheral 201a within software container 211. After step 1c, application 213 will "see" peripheral 201a and will therefore be able to send requests to it.

Turning to FIG. 4B, once container agent 212 has caused peripheral 201a to appear within software container 211, application 213 will be able to send I/O requests to peripheral 201a in a typical fashion. However, as represented as step 2, container agent 212 and peripheral arbitrator 206 can interoperate to map these I/O requests between software container 211 and the host operating system environment. In particular, when container agent 212 receives an I/O request that targets peripheral 201a, it can relay sufficient information about the I/O request to enable peripheral arbitrator 206 to create and send an equivalent I/O request in the host operating system environment. Then, when peripheral arbitrator 206 receives a response (if any), it can send sufficient information to enable container agent 212 to create and return an equivalent response in the environment of software container 211. This functionality could be performed to allow application 213 to access any printer class peripheral that may be connected to computing device 200. If software container 211 is stopped (of which container service 208 may notify peripheral arbitrator 206) or if peripheral 201a is disconnected (or which the host operating system may notify peripheral arbitrator 206), peripheral arbitrator 206 can cancel any pending I/O requests pertaining to peripheral 201a.

As a result of the above-described functionality, peripherals can be dynamically provisioned to containers based on the type/class of peripherals that the container uses or requires. In some embodiments, this dynamic provisioning of peripherals can also include determining a current trust score of computing device 200 and only provisioning a peripheral to a container if the current trust score meets a threshold.

Figure 5:
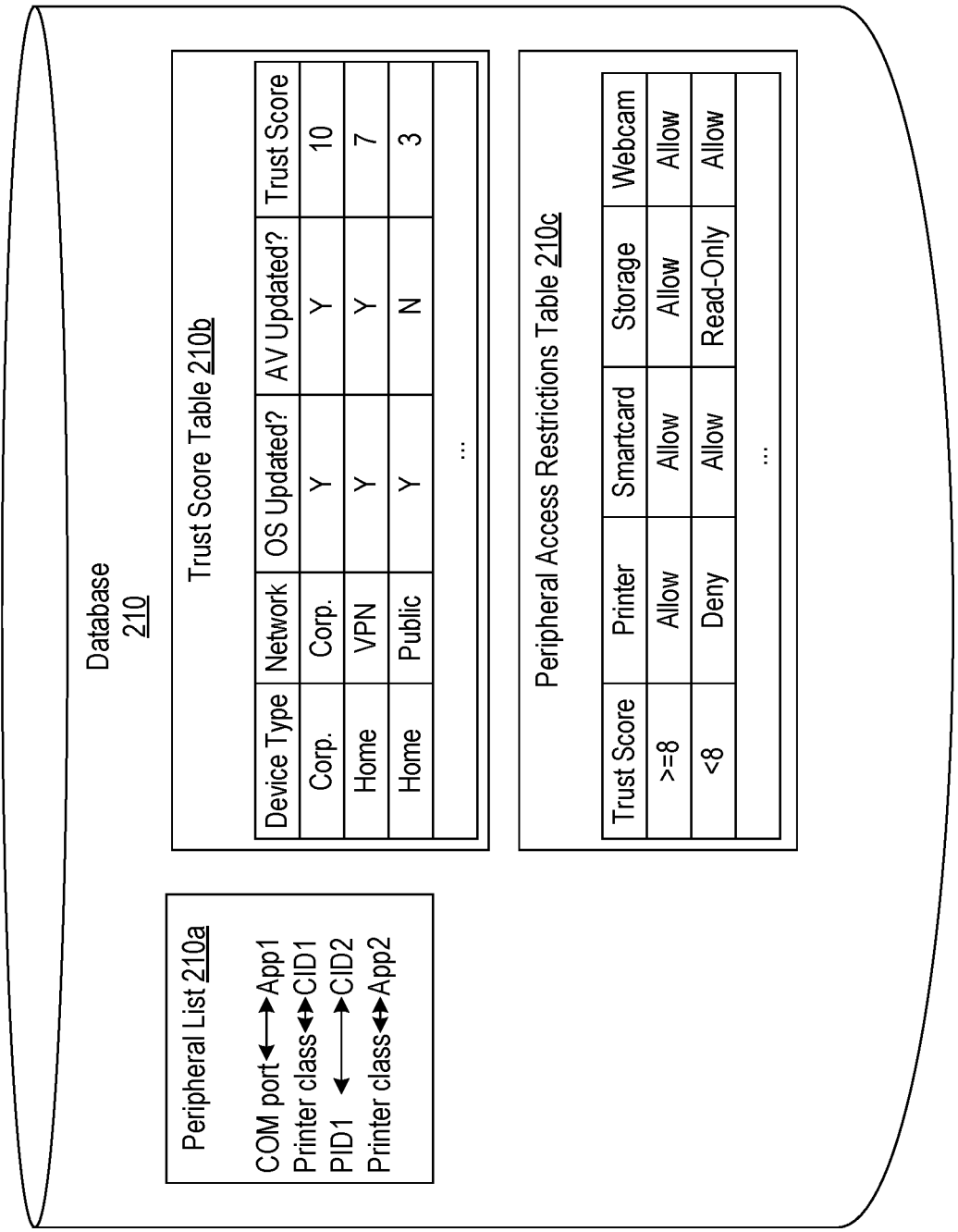
FIG. 5 provides an example of a database and various data structures that may be used in embodiments of the present invention.

FIG. 5 provides an example of how database 210 may be configured to facilitate using a trust score to dynamically provision a peripheral to a container. As shown, database 210 may include a trust score table 210b which can represent any data structure that includes information for calculating a current trust score for computing device 200. For example, trust score table 210b can be in the form of a lookup table where a trust score between 0-10 is determined based on the type of computing device 200 (e.g., whether it is a corporate/work computer or a home/personal computer), the type of network to which computing device 200 is connected (e.g., a corporate network, a VPN, a public network, a home network, etc.), whether the host operating system on computing device 200 has been updated, whether the antivirus solution on computing device 200 has been updated, etc.

Database 210 may also include a peripheral access restrictions table 210c which can represent any data structure that includes information for determining whether a particular type or peripheral should be accessible to a container based on the current trust score for computing device 200. In the depicted example, if the current trust score is at least 8, a container will be allowed to access each type of peripheral. In contrast, if the current trust score is less than 8, a container will be allowed to access smartcards and webcams, will have read-only access to storage peripherals and will not be allowed to access printers.

In some embodiments, an administrator may leverage management agent 207 to create and update trust score table 210b and peripheral access restrictions table 210c in database 210. For example, an administrator may define a policy governing all of an organization's computing devices, a subset of the organization's computing devices or a particular computing device, and push the policy to the instance of management agent 207 running on each respective computing device for storage in database 210. In some embodiments, a machine learning solution may leverage management agent 207 to monitor many computing devices, learn the most appropriate trust scores and then manage database 210 accordingly.

Figure 6:
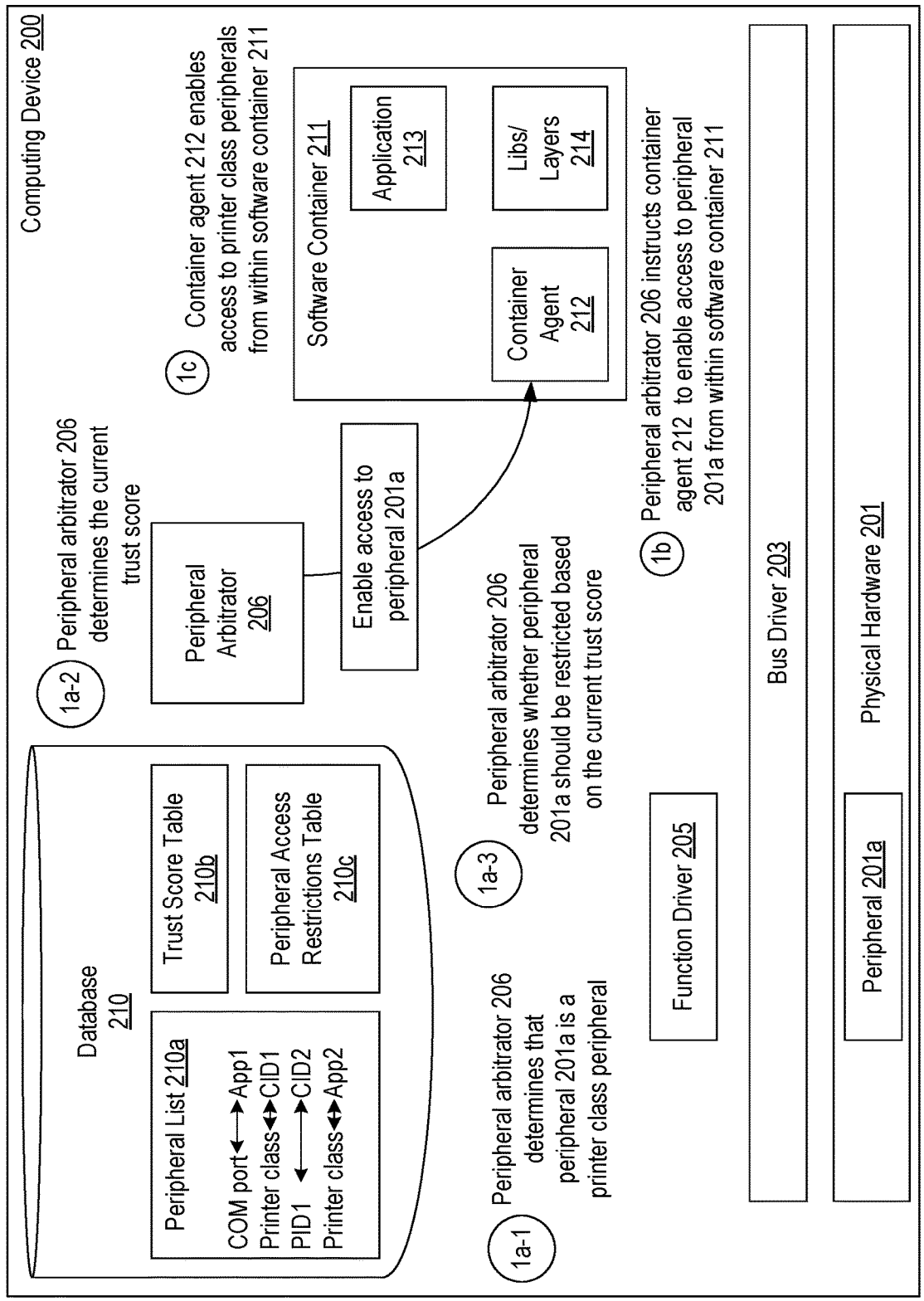
FIG. 6 provides an example of how a trust score may be used to determine whether a peripheral should be dynamically provisioned to a container.

FIG. 6, which is based on FIG. 4A, provides an example of how peripheral arbitrator 206 may use trust score table 210b and peripheral access restrictions table 210c as part of dynamically determining whether peripheral 201a should be provisioned to software container 211. In comparison to FIG. 4A, step 1a has been labeled as step 1a-1 in FIG. 6. In step 1a-2, peripheral arbitrator 206 may determine the current trust score for computing device 200 by identifying the relevant criteria (e.g., which type of computing device the user is using, which network the computing device is connected to, whether the OS/AV has been updated, etc.) and accessing trust score table 210b to obtain the current trust score for that criteria. Step 1a-2 could be performed at any time including in response to determining that a peripheral should be provisioned to software container 211 (e.g., in response to step 1a-1), at periodic intervals, whenever criteria for determining the trust score changes (e.g., when connecting to a different network, upon installing an update, etc.), etc. In any case, peripheral arbitrator 206 may determine/identify what the current trust score is for computing device 200 so that, in step 1a-3, peripheral arbitrator 206 may access peripheral access restrictions table 210c to determine whether peripheral 201a should be provisioned to software container 211. Based on the example in FIG. 5 and assuming that peripheral 201a is a printer and that the current trust score is at least 8, peripheral arbitrator 206 may determine, by accessing peripheral access restrictions table 210c, that peripheral 201a should be provisioned to software container 211 and may therefore proceed with step 1b as described above resulting in container agent 212 making peripheral 201a accessible within software container 211 in step 1c. On the other hand, if the trust score were less than 8, or if peripheral access restrictions table 210c otherwise indicated that access to printers should not be allowed based on the current trust score, peripheral arbitrator 206 may forego step 1b thereby preventing peripheral 201a from becoming accessible from within software container 211.

Figure 7A:
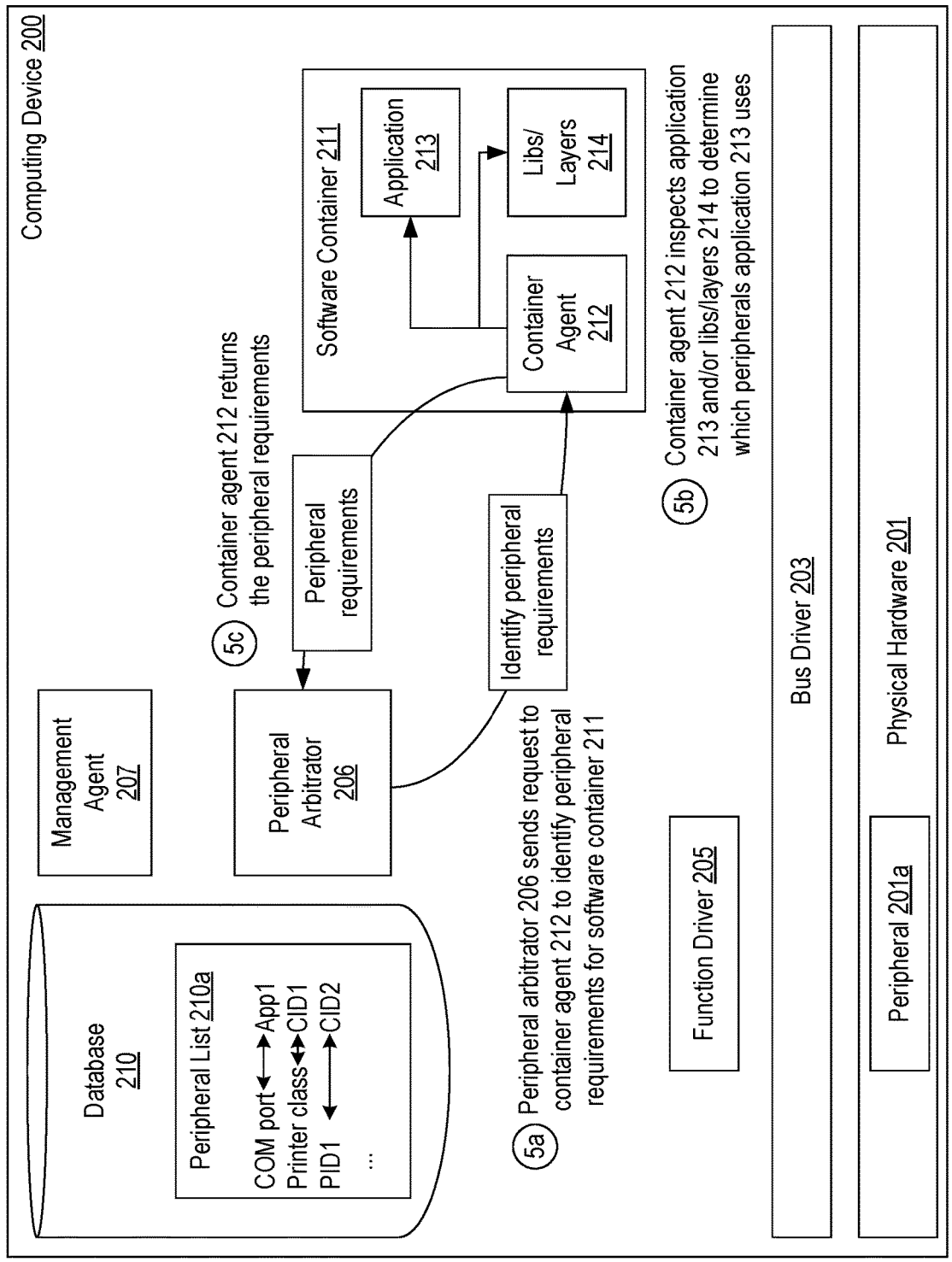
FIGS. 7A and 7B provide an example of how a peripheral may be dynamically provisioned to a container at the function level.
Figure 7B:
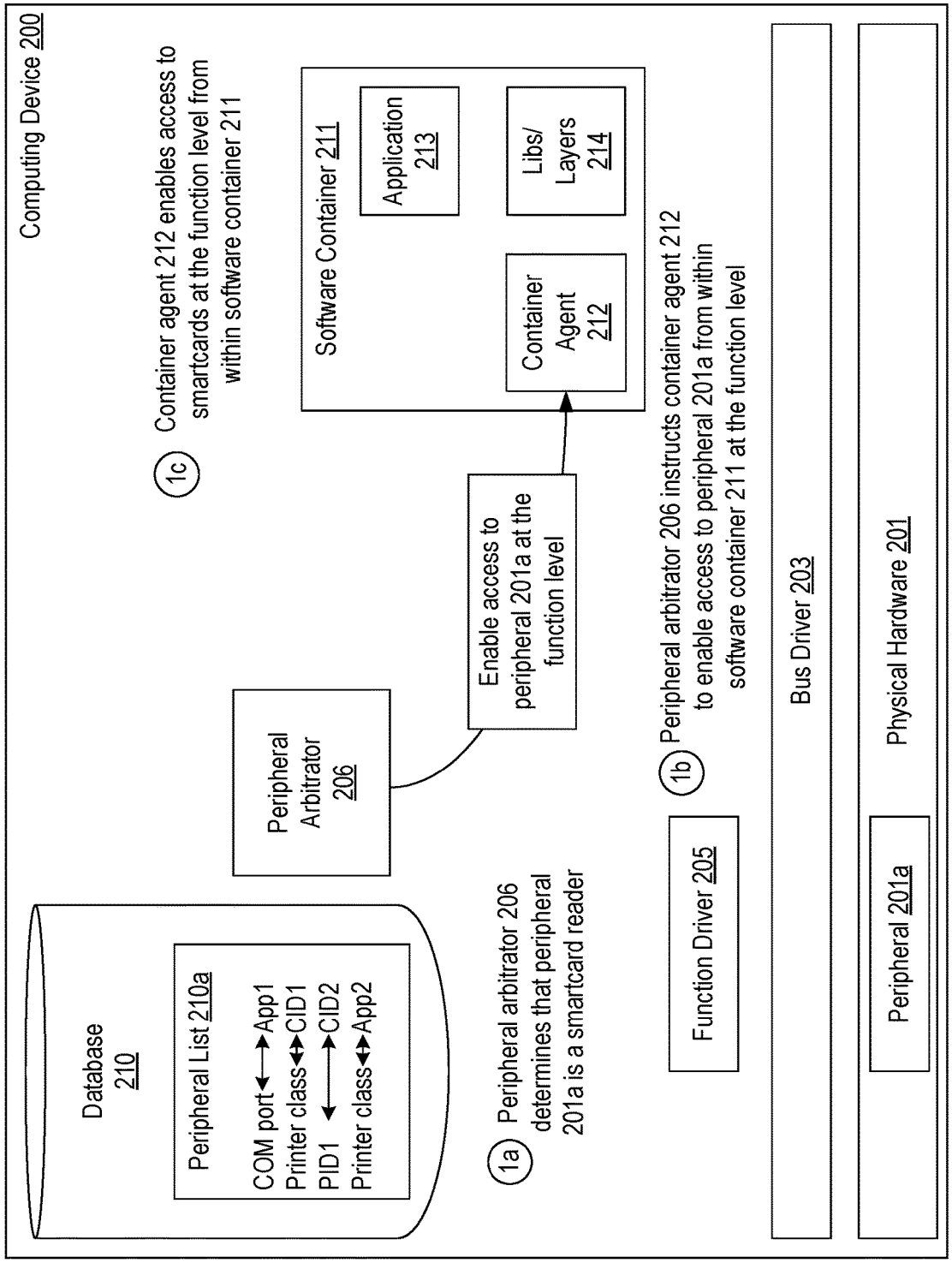

In some embodiments, peripheral arbitrator 206 may simultaneously provision a peripheral to multiple containers. For example, it may be desirable to simultaneously provision a smartcard to multiple containers hosting applications that require constant access to the smartcard. FIGS. 7A and 7B represent how peripheral arbitrator may dynamically provision peripherals in such cases.

FIG. 7A, which is based on FIG. 3E, represents that, as part of step 5b, container agent 212 may determine whether application 213 has registered for peripheral removal notifications within software container 211. For example, container agent 212 could interface with the operating system or other component running within software container 211 to determine if application 213 has registered a callback function to be called when peripherals are removed. If container agent 212 determines that application 213 has registered for peripheral remove notifications, in step 5c, container agent 212 can include an appropriate indication in the peripheral requirements it returns to peripheral arbitrator 206.

Turning to FIG. 7B, which is based on FIG. 4B but now assumes that peripheral 201a is a smartcard reader and that peripheral arbitrator 206 has determined that smart card readers should be provisioned to software container 211, steps 1b and 1c are the same as described above except that peripheral 201a is made accessible from within software container 211 at the function level as opposed to at the device level. For example, peripheral arbitrator 206 and container agent 212 may implement driver mapping to make peripheral 201a available to application 213. By provisioning peripheral 201a at the function level, peripheral arbitrator 206 can simultaneously provision peripheral 201a to other containers on computing device 200. For example, if hardware container 215 is created on computing device 200 while software container 211 is running, peripheral arbitrator 206 could provision peripheral 201a to hardware container 215 to allow application 216 to access it. Such may be the case when both application 213 and application 216 require constant connection to a smartcard or similar peripheral.

In some embodiments, peripheral arbitrator 206 may only provision a peripheral at the function level when the peripheral is a smartcard reader, a NFC device or other proximity device. In some embodiments, peripheral arbitrator 206 may only provision a peripheral at the function level when the peripheral uses default operating-system-provided drivers.

In summary, peripheral arbitrator 206 may dynamically provision peripherals to containers based on if/how the containers use such peripherals. Peripheral arbitrator 206 may also leverage trust scores to block the provisioning of peripherals when a container may be running in an unsecure or untrusted environment. Peripheral arbitrator 206 may also selectively and dynamically provision peripherals at the function level to multiple containers simultaneously.

Figure 8:
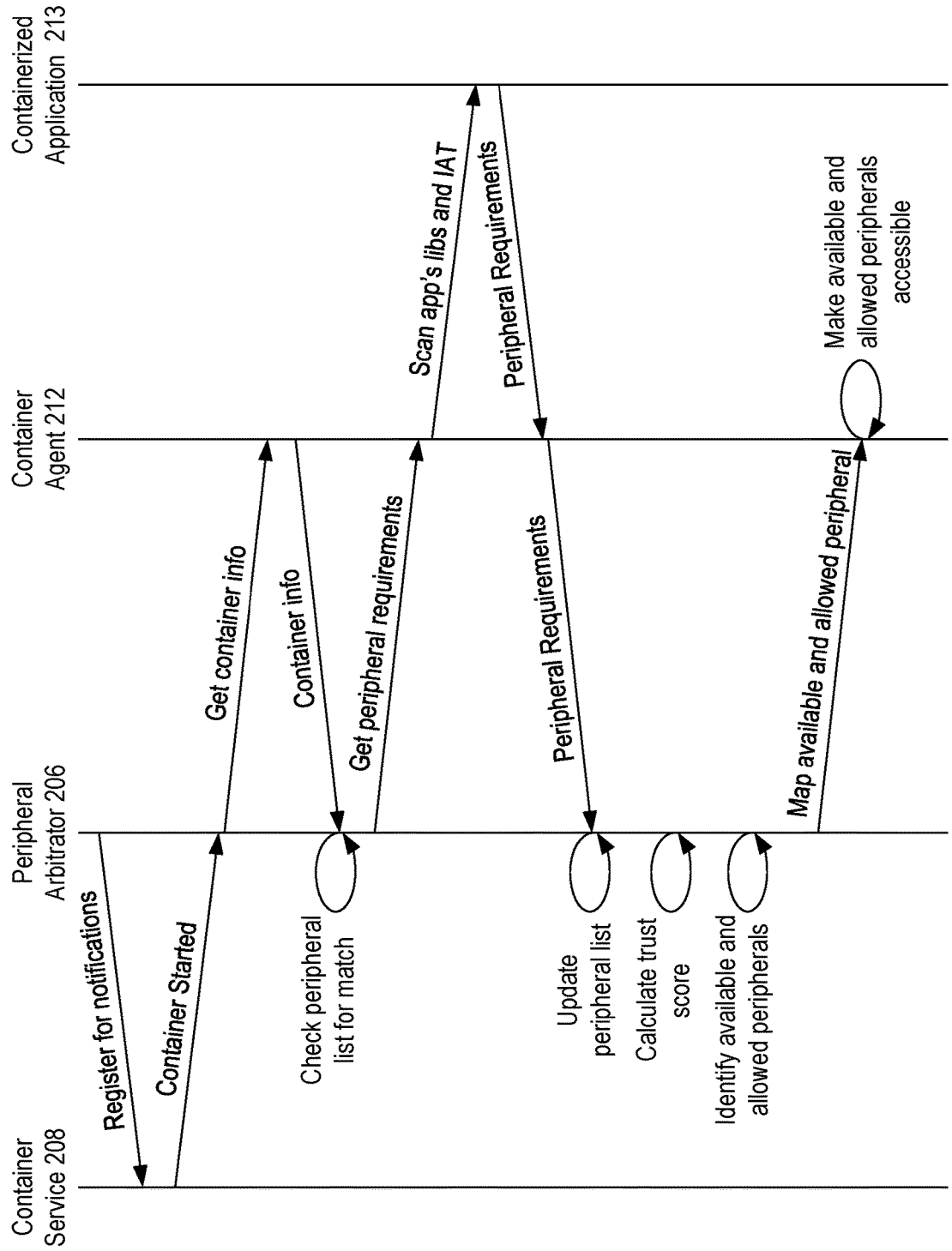
FIG. 8 provides a flow diagram representing functionality that may be performed in some embodiments of the present invention.

FIG. 8 provides a flow diagram summarizing how peripherals may be dynamically provisioned in some embodiments. As shown, peripheral arbitrator 206 may initially register with any container service 208 to receive notifications when container service 208 starts/creates a container. Then, when peripheral arbitrator 206 receives such a notification, it can get the container information for the container from container agent 212 (and possibly other sources). Using the container information, peripheral agent 206 can check peripheral list 210a for any matching entries. Assuming a match does not exist, peripheral arbitrator 206 can instruct container agent 212 to retrieve peripheral requirements for the application(s) running in the container (e.g., application 213). Container agent 212 may do so by scanning application 213's libraries, import address table (IAT) or other structure. When the peripheral requirements are returned to peripheral arbitrator 206, it may update peripheral list 210a appropriately, calculate a current trust score and determine whether there are any available and allowed peripherals. In other words, peripheral arbitrator 206 can use the peripheral requirements to determine which peripherals application 213 uses, determine whether any of such peripherals are available and determine whether the current trust score is high enough to allow such peripherals to be made available to the application. If so, peripheral arbitrator 206 may instruct container agent 212 to make the available and allowed applications accessible within the container (or otherwise cause the available and allowed applications to be accessible within the container).

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for dynamically provisioning a peripheral to a container, the method comprising:
   identifying a first container on a computing device;
   determining peripheral requirements of a first application running in the first container including determining that the first application has registered for peripheral removal notifications;
   determining that a first peripheral available on the computing device matches the peripheral requirements of the first application;
   based on determining that the first application has registered for peripheral removal notifications, provisioning the first peripheral to the first container at the function level;
   identifying a second container on the computing device;
   determining peripheral requirements of a second application running in the second container including determining that the second application has registered for peripheral removal notifications;
   determining that the first peripheral matches the peripheral requirements of the second application; and
   based on determining that the second application has registered for peripheral removal notifications, provisioning the first peripheral to the second container at the function level such that the first peripheral is simultaneously accessible to the first application running in the first container and the second application running in the second container.

2. The method of claim 1, wherein identifying the first container on the computing device comprises receiving a notification that the first container has been started or created on the computing device.

3. The method of claim 1, wherein identifying the first container on the computing device comprises receiving container information from a container agent running in the container.

4. The method of claim 3, wherein the container information includes an identification of the first application running in the first container.

5. The method of claim 1, wherein determining the peripheral requirements of the first application running in the first container comprises accessing a peripheral list.

6. The method of claim 5, wherein accessing the peripheral list comprises determining that the peripheral list associates an identifier of the first container with the peripheral requirements.

7. The method of claim 6, wherein the identifier of the first container includes one or more of:
   a unique identifier of the first container;
   an identifier of the first application running in the first container; or
   an IP address of the first container.

8. The method of claim 1, wherein determining the peripheral requirements of the first application running in the first container comprises examining the first application running in the first container.

9. The method of claim 8, wherein examining the first application running in the first container comprises examining an import address table or a library of the first application.

10. The method of claim 8, further comprising:
    storing an association between the peripheral requirements and the first container in a peripheral list.

11. The method of claim 10, wherein the association between the peripheral requirements and the first container comprises an association between a type or class of peripheral and an identifier of the first container or the first application running in the first container.

12. The method of claim 1, further comprising:
    determining a trust score for the computing device;
    determining, based on the trust score, that the first peripheral is allowed to be provisioned to the first container;
    wherein the first peripheral is provisioned to the first container after determining, based on the trust score, that the first peripheral is allowed to be provisioned to the first container.

13. One or more computer storage media storing computer executable instructions which when executed on a computing device implement a method for dynamically provisioning peripherals to containers on the computing device, the method comprising:

detecting when an application has been launched in a container;

determining peripheral requirements for the application;

determining a trust score for the computing device;

determining whether the trust score exceeds a threshold; and provisioning one or more peripherals to the container based on the peripheral requirements only when the trust score exceeds the threshold.

14. The computer storage media of claim 13, wherein the method further comprises:

determining that a peripheral list does not include an entry matching the application or the container; and updating the peripheral list to associate the peripheral requirements for the application with an identifier of the application or the container.

15. The computer storage media of claim 13, wherein determining the peripheral requirements for the application comprises examining a library or an import address table of the application.

16. A computing device comprising:

one or more processors; and one or more computer storage media storing:

a peripheral arbitrator that executes in a host operating system environment; and a container agent that executes within a container;

wherein the peripheral arbitrator and the container agent are configured to identify peripheral requirements for an application executing in the container and to provision one or more peripherals to the container based on the peripheral requirements, wherein the peripheral arbitrator selectively provisions the one or more peripherals to the container based on a trust score of the computing device.

* * * * *